Dec. 19, 1939.  F. J. YOUNG  2,183,878
LUBRICATING DEVICE FOR CROSS HEADS
Filed Nov. 8, 1937
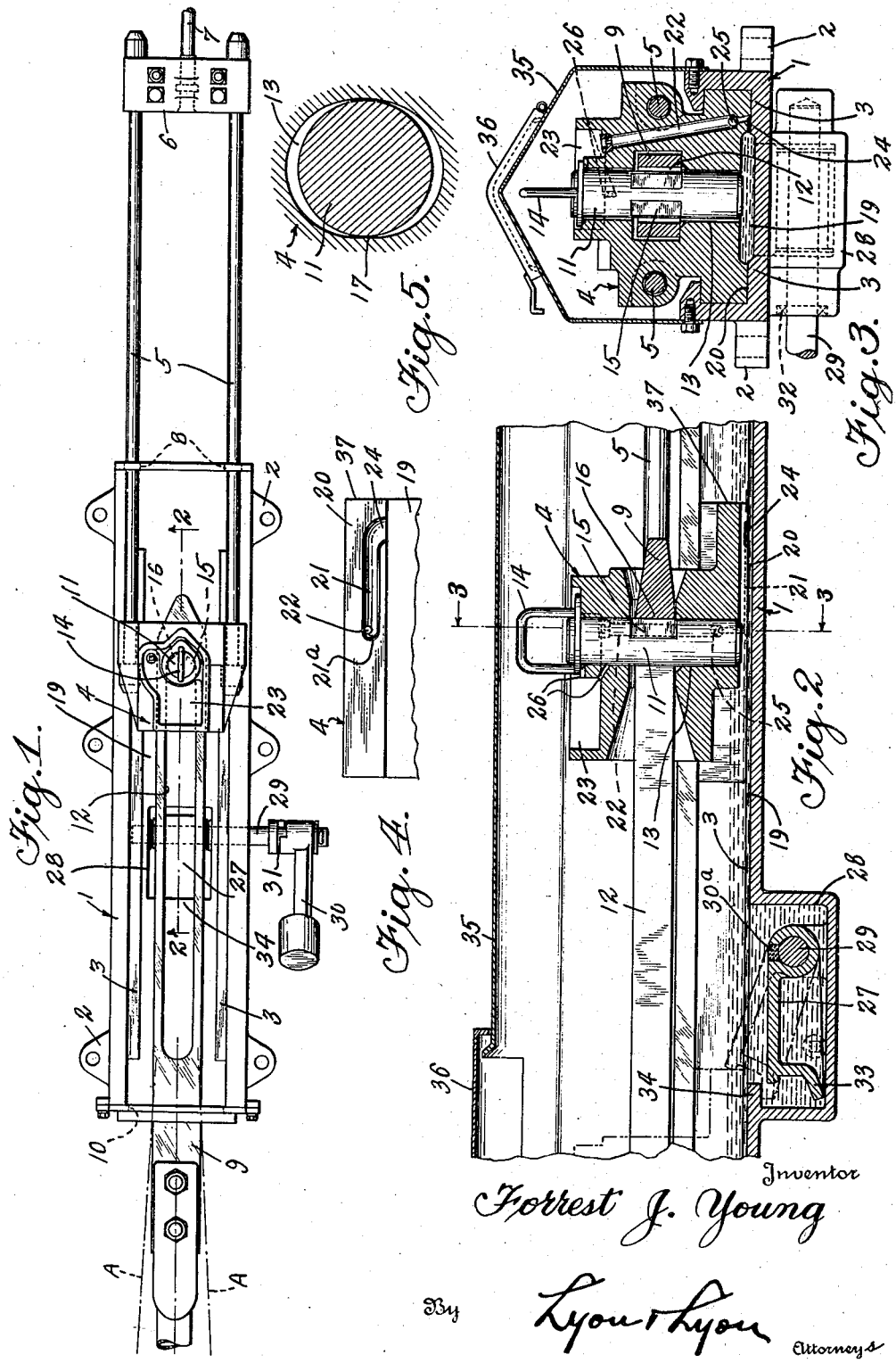
Inventor
Forrest J. Young
By Lyon & Lyon
Attorneys Patented Dec. 19, 1939

2,183,878

UNITED STATES PATENT OFFICE 2,183,878

LUBRICATING DEVICE FOR CROSS HEADS

Forrest J. Young, Los Angeles, Calif., assignor to The National Supply Company, Torrance, Calif., a corporation of Pennsylvania Application November 8, 1937, Serial No. 173,288

13 Claims. (Cl. 308—5)

This invention relates to lubricating devices for cross heads, and more particularly to a lubricating means for the maintaining of proper lubrication of a reciprocating cross head and connecting mechanism wherein the reciprocating mechanism or cross head is so formed as to deliver during its operation a supply of lubricant to the moving parts of such mechanism.

In order to illustrate this invention, I have chosen to show the same in connection with a safety throw-off iron used as a connecting medium between a central source of power and a well pumping mechanism, which connection provides a means of releasably connecting the well pumping mechanism with the central source of power. The safety throw-off iron may be of the character disclosed in the Edward Timbs and Lester E. Peck Reissue Patent No. 18,620, reissued October 11, 1932.

It is an object of this invention to provide a lubricating device for two relatively reciprocating members, which lubricating device utilizes a relative movement between moving surfaces of said reciprocating members to deliver a supply of lubricant to the moving parts of such reciprocating device.

Another object of this invention is to provide a lubricating device for lubricating a cross head connection, which lubricating device includes a pumping means of the viscosity type whereby a flow of lubricant is induced by the reciprocating motion of one element within a stationary lubricating reservoir.

Another object of this invention is to provide a lubricating means for a reciprocating cross head mechanism which utilizes an oil groove in one element of said reciprocating structure between the relative reciprocating surfaces thereof and includes a lateral inlet groove through which the lubricant is delivered to the oil groove so as to prevent the formation of an air lock during the portion of the reciprocating cycle in which lubricant is not being picked up in the oil groove.

Another object of this invention is to provide a connecting mechanism for use between a pumping well and its power source which includes a lubricating means for lubricating the pin utilized in connecting the driving and driven elements and wherein such connecting pin is constantly supplied with lubricant during its operation through the reciprocating motion incident to the normal operation of the connecting mechanism.

Other objects and advantages of this invention it is believed will be apparent from the following detailed description of a preferred embodiment thereof as illustrated in the accompanying drawing.

In the drawing:

Figure 1 is a plan view of a safety throw-off connection illustrating the lubricating device for the cross head thereof embodying my invention and illustrating the connecting mechanism with the cover thereof removed.

Figure 2 is an enlarged fragmental sectional view thereof taken substantially on the line 2—2 of Figure 1.

Figure 3 is a sectional end elevation taken substantially on the line 3—3 of Figure 2.

Figure 4 is an enlarged fragmental view illustrating a portion of the bottom of the face of the cross head and the oil groove and lateral opening thereof.

Figure 5 is an enlarged sectional detail illustrating the connecting pin and mounting thereof in the cross head of the connecting mechanism.

The connector in which my invention is illustrated as applied is usually referred to as a "safety throw-off" iron and is used for connecting a central source of power with the pump apparatus of a particular well. The pumping apparatus of many such wells are through similar connections actuated from a single central power supply. The connector includes a base 1 which is provided with hold-down lugs 2 for securing the base to any suitable form of foundation or substructure, not shown. The base 1 is formed to provide parallel ways 3 extending longitudinally of the base and the ways 3 guiding a cross head 4 for sliding movement therealong.

The cross head 4 is connected by means of reins 5 to an adapter 6 to which adapter 6 the pump rod 7 is connected. Openings 8 are formed in the base 1 to allow unrestricted reciprocation of the reins 5. The cross head 4 is also connected with a tongue 9, which tongue 9 is operatively connected with a source of power (not shown) but which source of power tends to give to the tongue 9 an oscillatory motion in a direction transverse of the direction of reciprocation of the cross head 4 as indicated by the dotted lines A. The tongue 9 imparts a reciprocatory motion to the cross head 4 and the connection provided between the source of power and the pump rod 7 is, during operation, a tension connection so that there is maintained a tension in the tongue 9, reins 5, and pump rod 7. The source of power utilized for reciprocating the tongue 9 may be similar to that disclosed in the Timbs et al. patent above referred to.

A guide slot 10 is formed in the base 1 through which the tongue 9 reciprocates and the slot opening in the base is of sufficient width to permit of the required oscillatory motion of the tongue 9 as imparted to the tongue by the source of power.

The tongue 9 is releasably connected to the cross head 4 by means of a pin 11, which pin 11 is passed through an opening 12 in the tongue 9 and passes through an opening 13 formed in the cross head 4. The pin 11 is provided with a handle 14 for convenience in removing the same from its connecting position between the cross head 4 and tongue 9.

As the tongue 9 in operation may have an oscillatory motion with respect to the cross head 4, it is desirable to hold the pin 11 fixed relative to the cross head 4 or the tongue 9 so that the pin 11 will have relative movement with only one of these members and not both of them. In the structure as illustrated, the pin 11 is provided with a non-circular section 15 which is engaged, and cooperates with, a similarly non-circular-shaped section 16 formed at the end of the slot or opening 12 of the tongue 9. In this manner relative movement between the tongue 9 and the pin 11 is prevented as the parts are maintained in tension during operation.

In order to compensate for the oscillatory motion imparted to the tongue 9, the pin 11 is mounted in the hole 13 formed in the cross head 4 and which hole 13 is formed as a non-circular bore, its greatest dimension lying in a direction at right angles to the direction of travel of the cross head 4 during reciprocation. The opening 13 is preferably formed so that the radius of curvature of the portion 17 of the hole 13 is greater than the radius of the pin 11. The contacted portion at the engaging surface 17 might even be flat. The pin 11 will therefore have a rolling rather than a sliding contact with the wall 17 throughout its range of movement.

In the construction as illustrated, the maximum angularity of the tongue 9 relative to the direction of travel of the cross head 4 is kept below the value at which the pin 11 would slip laterally upon the inner surface 17 of the opening 13. The pin 11 and contacted surface 17 therefore have only relative rolling contact.

In order to disconnect the tongue 9 from the pump rod 7, a lock pawl 27 is positioned within the recess 28 formed in the base 1. The lock pawl 27 is fixed to a rotatable shaft 29 as by means of welding 30ª. The shaft 29 extends through the base 1 and is provided on its projecting end with a weighted lever 30 through a lost motion connection 31.

Packing 32 is provided between the shaft 29 and the base 1 to prevent leakage of oil. Movement of the lever 30 toward the pump rod 7 acts to move the pawl 27 in the position illustrated in dotted lines in Figure 2. Further movement of the pawl 27 is prevented by the foot 33 thereof engaging with a projection 34 of the base 1. When the pawl 27 is in the position illustrated by the dotted lines, it forms an obstruction in the path of the cross head 4, thereby holding the cross head 4 from reciprocation with the tongue 9 permitting the tongue 9 to move away from the pin 11, thereby releasing the pin 11 so that it may be removed.

A cover 35 is secured to the base 1 to exclude foreign matter, and this cover is formed with a hinged door 36 which may be raised for the purpose of permitting withdrawal or replacement of the pin 11.

The lubricating device embodying my invention as applied to this structure provides for the constant lubrication of the pin 11 as well as the cross head 4 during its reciprocating motion. In order to accomplish this, the base 1 is formed to provide a lubricating chamber 19 which is formed between the ways 3 to lubricate the ways 3 and the cooperating sliding portions of the cross head 4.

The level of the lubricant in this chamber is maintained substantially above the lower sliding surface 20 of the cross head 4.

In order to provide for the automatic pick-up and distribution of the lubricant maintained within the chamber 19, a groove 21 is formed in the lower sliding surface 20 of the cross head 4. This groove 21 extends in a direction substantially parallel to the direction of travel of the cross head 4. At one end of the groove there is formed a passage 22 which extends upwardly through the cross head 4 and terminates in the lubricant receiving chamber 23. At the other end of the groove 21 there is formed a laterally extending channel 24 which opens into the chamber 19. A ball check valve 25 is mounted in the passage 22 and acts in a direction to prevent lubricant delivered to the chamber 23 being returned through the passage 22 to the chamber 19. Lubricant ports 26 are formed in the chamber 23 for conducting lubricant to the pin 11.

The operation of the lubricating device embodying my invention is, upon movement of the cross head 4 toward the right as viewed in Figure 2, lubricant from the chamber 19 enters the groove 21, and due to its viscosity, adheres to the portion of the surface of the stationary way 3 immediately below the groove 21. The lubricant is then collected in the groove 21 at its end 21ª resulting in the lubricant being forced upward through the passage 22 through the valve 25 and into the reservoir 23. The lubricant passes into the channel 21 through the lateral opening 24. If this lateral opening 24 were not present and the groove 21 extended straight through to the end 37 of the block or cross head 4, the pumping action might be rendered ineffective by the formation of an airlock. Such airlock might occur upon movement of the cross head to the left as such movement of the end 37 of the cross head tends to pull away from the lubricant in the chamber 19 forming a zone of relatively low pressure or even of complete absence of lubricant immediately adjacent the end 37 of the cross head 4. If the groove 21 extended to the end 37 under such circumstances, air would be drawn into the groove 21 and would then form an airlock, seriously interfering with the pumping operation upon the return stroke of the cross head 4.

While I have illustrated my invention as particularly adapted to a "safety throw-off iron" connection, it is to be understood that my invention is not limited in its applicability to the lubrication of the connecting pin in such a well pumping mechanism as illustrated and described but my invention is applicable to use in other instrumentalities embodying a reciprocating block or member and to lubricate other parts of moving connections in substantially the same manner as hereinabove described.

Having fully described my invention, it is to be understood that I do not wish to be limited to the details herein set forth, but my invention is of the full scope of the appended claims.

I claim:

1. In a lubricating device, the combination of, a pair of cooperating members adapted for relative reciprocating motion, a surface associated with one of said members being adapted to slide on a complementary surface associated with the other of said members, a groove on one of said surfaces extending in a direction having a substantial component parallel to the direction of travel, means providing a lubricant chamber having a normal lubricant level above said groove, inlet means from said chamber to said groove, and passage means communicating with said groove at a point spaced from said inlet means, whereby relative movement of said surfaces induces a flow of lubricant through said groove and nto said passage means.

2. In a lubricating device, the combination of, a pair of cooperating members adapted for relative reciprocation, a surface associated with one of said members being adapted to slide on a complementary surface associated with the other of said members, a groove on one of said surfaces extending in a direction having a substantial component parallel to the direction of travel, means providing a lubricant chamber having a normal lubricant level above said groove, inlet means from said chamber to said groove, said inlet means including a lateral channel opening into the lubricant chamber at an angle to the direction of travel, and passage means communicating with said groove at a point spaced from said inlet means, whereby relative movement of said surfaces induces a flow of lubricant through said groove and into said passage means.

3. In a lubricating device, the combination of, a base, a block adapted to slide on said base, a first surface associated with said block being adapted to slidably contact a complementary surface associated with said base, a groove in the first surface extending in a direction having a substantial component parallel to the direction of travel of the block relative to the base, the ends of said groove terminating short of the ends of said first surface, means providing a lubricant chamber associated with said base, inlet means near one end of said groove communicating with said chamber, and discharge passage means communicating with said groove near the other end.

4. In a device of the class described, the combination of, a base, a block adapted to slide on said base, a fluid chamber formed in the base, means including a pair of complementary sliding surfaces associated with said base and block respectively and positioned below the normal level of fluid in said chamber, a groove in said block surface having one end in communication with said chamber, discharge passage means in said block communicating with said groove, whereby relative movement of said surfaces induces a flow of fluid from said chamber through said groove and passage means to a height above said normal fluid level.

5. In a device of the class described, the combination of, a base, a block adapted to slide on said base, a fluid chamber formed in the base, means including a pair of complementary sliding surfaces associated with said base and block respectively and positioned below the normal level of fluid in said chamber, a groove in said block surface having one end in communication with said chamber, discharge passage means in said block communicating with said groove, whereby movement of said block in one direction induces a flow of fluid from said chamber through said groove and passage means to a height above said normal fluid level, and means to prevent reverse flow of fluid in said passage means upon movement of the block in the other direction.

6. In a device of the class described, the combination of, a base, a block adapted to slide on said base, a fluid chamber formed in the base and extending substantially throughout the range of travel of said block, a portion of said block extending below the normal fluid level in said chamber, complementary means on said base forming a sliding contact with said block portion, a groove in said block portion having one end in communication with said chamber, discharge passage means in said block communicating with the groove at a point spaced from the said end, whereby relative sliding movement of said block and base induces a flow of fluid from said chamber through said groove and passage means to a height above said normal fluid level.

7. In a device of the class described, the combination of, a base, a block adapted to slide on said base, a fluid chamber formed in the base and extending substantially throughout the range of travel of said block, a portion of said block extending below the normal fluid level in said chamber, complementary means on said base forming a sliding contact with said block portion, a groove in said block portion having one end in communication with said chamber, discharge passage means in said block communicating with the groove at a point spaced from the said end, whereby sliding movement of said block in one direction induces a flow of fluid from said chamber through said groove and passage means to a height above said normal fluid level, and means adapted to prevent reverse flow of fluid in said passage means upon movement of the block in the other direction.

8. In a device of the class described, the combination of a base, a block adapted to slide on said base, a plane surface on the block adapted to slidably contact a complementary plane surface on the base, a groove in the said block surface extending in a direction substantially parallel to the direction of travel of said block, the ends of the groove terminating short of the ends of the said block surface, a fluid chamber having a normal fluid level above said groove and said complementary plane surface, inlet means from said chamber to said groove including a lateral channel opening into the chamber below said fluid level and at an angle to the direction of travel of said block, and discharge passage means communicating with said groove at a point spaced from said inlet means.

9. In a device of the class described, the combination of, a base, a cross head to slide on said base, means to connect the cross head to the pump rod, a tongue operatively associated with a power mechanism, means including a pin to connect the tongue to the cross head, the tongue being free to oscillate through a certain angle with respect to the cross head, the base having a chamber for lubricant, a groove in said cross head below the level of lubricant in said chamber, inlet means from said chamber to said groove, a lubricant passageway in said cross head communicating with said groove at one end and said pin at the other end, a surface on said base adapted to cooperate with said groove whereby sliding movement of the cross head acts to pump lubricant to said pin.

10. In a device of the class described, the combination of, a base having parallel ways, a lubricant chamber in said base adapted to flood the surface of said ways, a cross head for reciprocation on said ways, means to connect the cross head to the pump rod, a tongue operatively associated with a power mechanism, connecting means between the cross head and the tongue comprising a pin positioned in the cross head and extending through an opening in the tongue, a groove in the cross head adjacent the surface of one of said ways, a lubricant passageway in said cross head communicating with said groove at one end and with said connecting means at the other, whereby movement of the cross head in one direction acts to pump lubricant to said connecting means, and a check valve adapted to prevent reverse flow of lubricant in said passageway upon movement of the cross head in the other direction.

11. In a device of the class described, the combination of, a base, a cross head guided to slide on said base, means to connect the cross head to the pump rod, a tongue operatively associated with a power mechanism, means including a pin to connect the tongue to the cross head, the tongue being free to oscillate through a certain angle with respect to the cross head, the base having a chamber for lubricant, a groove in said cross head below the level of lubricant in said chamber, a lubricant passageway in said cross head communicating with said groove at one end and said pin at the other end, a surface on said base adapted to cooperate with said groove whereby sliding movement of the cross head in one direction acts to pump lubricant to said pin, and a check valve adapted to prevent reverse flow of lubricant in said passageway upon movement of the cross head in the other direction.

12. In a device of the class described, the combination of, a bed plate, parallel guideways on said bed plate adapted to form the side walls of a lubricant chamber, a cross head adapted to slide in said guideways, means to connect the cross head to a driven mechanism, a tongue operatively associated with a driving mechanism, means including a pin to connect the tongue to the cross head, a lubricant reservoir in said cross head for lubricating said pin, a groove in said cross head below the level of lubricant in said chamber and adjacent a surface of one of said guideways, the groove extending substantially parallel to said guideways and being provided near one end with a lateral channel opening into said chamber, passage means in said cross head leading from said groove to said cross head reservoir, whereby sliding movement of the cross head acts to pump lubricant through said passage means from said chamber to said reservoir.

13. In a device of the class described, the combination of a bed plate, parallel guideways on said bed plate adapted to form the side walls of a lubricant chamber, a cross head adapted to slide in said guideways, means to connect the cross head to a driven mechanism, a tongue operatively associated with a driving mechanism, means including a pin to connect the tongue to the cross head, a lubricant reservoir in said cross head for lubricating said pin, a groove in said cross head below the level of lubricant in said chamber and adjacent a surface of one of said guideways, the groove extending substantially parallel to said guideways and being provided near one end with a lateral channel opening into said chamber, passage means in said cross head leading from said groove to said cross head reservoir, whereby sliding movement of the cross head in one direction acts to pump lubricant through said passage means from said chamber to said reservoir, and a check valve adapted to prevent reverse flow of lubricant in said passage means upon movement of the cross head in the other direction.

FORREST J. YOUNG.